(12) United States Patent
Minemoto et al.

(10) Patent No.: US 7,855,823 B2
(45) Date of Patent: Dec. 21, 2010

(54) ACOUSTOOPTIC DEVICE AND OPTICAL IMAGING APPARATUS USING THE SAME

(75) Inventors: Hisashi Minemoto, Osaka (JP); Yasuo Kitaoka, Osaka (JP); Isao Kidoguchi, Hyogo (JP); Takayuki Negami, Osaka (JP); Yasuhito Takahashi, Osaka (JP); Toshimi Nishiyama, Osaka (JP); Kimihiko Shibuya, Osaka (JP)

(73) Assignee: Panasonic Corporation, Osaka (JP)

( * ) Notice: Subject to any disclaimer, the term of this patent is extended or adjusted under 35 U.S.C. 154(b) by 776 days.

(21) Appl. No.: 11/571,218

(22) PCT Filed: Jun. 29, 2005

(86) PCT No.: PCT/JP2005/011994

§ 371 (c)(1),
(2), (4) Date: Dec. 22, 2006

(87) PCT Pub. No.: WO2006/003955

PCT Pub. Date: Jan. 12, 2006

(65) Prior Publication Data

US 2008/0037100 A1 Feb. 14, 2008

(30) Foreign Application Priority Data

Jun. 30, 2004 (JP) .............................. 2004-193434

(51) Int. Cl.
*G02F 1/11* (2006.01)
*G02F 1/33* (2006.01)

(52) U.S. Cl. ........................ 359/285; 359/305; 359/312

(58) Field of Classification Search ................ 359/285, 359/287, 305, 311, 312

See application file for complete search history.

(56) References Cited

U.S. PATENT DOCUMENTS 6,414,781 B1    7/2002  Saitoh (Continued)

FOREIGN PATENT DOCUMENTS

JP        11-218612        8/1999

(Continued)

OTHER PUBLICATIONS

Chang, et al., "High Performance AOTFs for Ultraviolet", Proceedings of 1988 IEEE Ultrasonics Symposium, pp. 1289-1292.

(Continued)

*Primary Examiner*—Ricky L Mack
*Assistant Examiner*—Brandi N Thomas
(74) *Attorney, Agent, or Firm*—Hamre, Schumann, Mueller & Larson, P.C.

(57) ABSTRACT

The present invention provides an acoustooptic device usable even with light in the ultraviolet region, free from laser damage and optical damage, and excellent in acoustooptic performance and an optical imaging apparatus using the same. The acoustooptic device according to the present invention includes a high-frequency signal input part (65), a transducer part (64), and an acoustooptic medium (6). A high-frequency signal input from the high-frequency signal input part (65) is converted into a mechanical vibration by the transducer part (64), and an optical characteristic of the acoustooptic medium (6) varies depending on the mechanical vibration. The acoustooptic medium is formed of a Group III nitride crystal. The optical imaging apparatus according to the present invention includes a light source, an acoustooptic device, a driving circuit, and an image plane. Light from the light source is diffracted by the acoustooptic device in accordance with a signal from the driving circuit and the resultant diffracted light forms an image on the image plane. An acoustooptic medium of the acoustooptic device is formed of a Group III nitride crystal.

20 Claims, 3 Drawing Sheets

U.S. PATENT DOCUMENTS

| | | | |
|---|---|---|---|
| 6,577,375 B1 | 6/2003 | Umehara et al. | |
| 6,592,663 B1 | 7/2003 | Surayama et al. | |
| 6,630,693 B1 * | 10/2003 | Martin et al. | 257/98 |
| 6,692,568 B2 * | 2/2004 | Cuomo et al. | 117/84 |
| 6,903,862 B2 * | 6/2005 | Minemoto et al. | 359/305 |
| 2004/0090660 A1 | 5/2004 | Minemoto et al. | |

FOREIGN PATENT DOCUMENTS

| | | |
|---|---|---|
| JP | 2000-284700 | 10/2000 |
| JP | 2001-102316 | 4/2001 |
| JP | 2002-527343 | 8/2002 |
| JP | 2002-365535 | 12/2002 |
| JP | 2003-195421 | 7/2003 |
| JP | 2003-215648 | 7/2003 |
| JP | 2004-170940 | 6/2004 |
| JP | 2004-300024 | 10/2004 |
| WO | 00/22204 | 4/2000 |

OTHER PUBLICATIONS

Uchida, et al., "Acoustooptic Deflection Materials and Techniques", Proceedings of the IEEE, vol. 61, No. 8, 1973, pp. 1073-1092.

Rimeika, et al., "Diffraction of guided optical waves by surface acoustic waves in GaN", Applied Physics Letters, vol. 77, No. 4, 2000, pp. 480-482.

Bu, et al., "Guided-wave acousto-optic diffraction in $Al_xGa_{1-x}N$ epitaxial layers", Applied Physics Letters, vol. 85, No. 12, 2004, pp. 2157-2159.

Rimeika, et al., "Acousto-optic diffraction of blue and red light Gan", Applied Physics Letters, vol. 80, No. 10, March 11, 2002, pp. 1701-1703.

* cited by examiner

ACOUSTOOPTIC DEVICE AND OPTICAL IMAGING APPARATUS USING THE SAME

TECHNICAL FIELD

The present invention relates to an acoustooptic device and an optical imaging apparatus using the same.

BACKGROUND ART

Conventionally, a $TeO_2$ crystal or a $PbMoO_4$ crystal has been used as an acoustooptic medium for visible light emitted from an argon laser or a helium-neon laser. On the other hand, it has been studied to combine an acoustooptic device with a light source that utilizes light in the blue to ultraviolet region, e.g., a YAG laser that emits third to fourth harmonics or a semiconductor laser that emits light with various short wavelengths. Examples of the acoustooptic device include acoustooptic modulators, acoustooptic deflectors, acoustooptic filters, and acoustooptic frequency shifters.

As an acoustooptic medium of a conventional acoustooptic modulation device that utilizes light within the ultraviolet region, quartz glass, a quartz crystal, a KDP crystal, or the like has been used (see Non-Patent Documents 1 and 2, for example). In recent years, the use of various types of borate-based crystal for ultraviolet acoustooptic devices has been studied (see Patent Document 1, for example).

However, in an acoustooptic device in which a $PbMoO_4$ crystal is used, since the absorption edge wavelength is around 410 nm in the $PbMoO_4$ crystal, there has been a problem in that light in the ultraviolet region with a wavelength of 380 nm or shorter is not transmitted therethrough (herein, light with a wavelength of 380 nm to 220 nm is defined as ultraviolet light). On the other hand, in an acoustooptic device in which a $TeO_2$ crystal is used, although the absorption edge wavelength is around 330 nm in the $TeO_2$ crystal, there has been a problem in that it is not suitable for the use where high pulse peak power is used, as disclosed in Patent Document 1.

Furthermore, the acoustooptic device in which quartz glass, a quartz crystal, or a KDP crystal is used delivers poor acoustooptic performance. Hence, a high-frequency signal power source for driving the acoustooptic device is required, so that the acoustooptic device has to be water-cooled to suppress the generation of heat therein. Moreover, although an acoustooptic device that is usable with light in the ultraviolet region and highly resistant to laser damage can be realized by the use of a borate-based crystal, such an acoustooptic device may not exhibit sufficient acoustooptic performance depending on its use.

Furthermore, when an acoustooptic device is used with light having a short wavelength, it faces a problem in that dust may adhere to its light incident surface and light emitting surface. In the case of light having a still shorter wavelength, there has been a problem in that suspended substances present in the air are decomposed and the resultant decomposition products are adsorbed on the light incident surface and the light emitting surface.

Furthermore, when the acoustooptic device is produced in an environment with low humidity, it may adsorb a trace amount of dust etc. present in the air, which brings about a problem in that, when a portion where the dust is adsorbed is irradiated with a laser beam, the light transmittance may deteriorate in that portion or the dust may be burned onto the light incident surface or the light emitting surface of the acoustooptic device.

On the other hand, an optical imaging apparatus has been studied that uses light in the blue to ultraviolet region as an apparatus for direct drawing on an electronic circuit board or a light source of various types of printer, for example. In an optical imaging apparatus using a conventional acoustooptic device, its acoustooptic medium has to be provided with moisture resistance and water-cooling has to be performed to dissipate heat, so that the size of a driving circuit etc. is increased. Moreover, dust adheres to a light incident surface and a light emitting surface of the acoustooptic device, so that the optical imaging apparatus cannot be used continuously for a long time.

Patent Document 1: JP 2004-170940 A

Non-Patent Document 1: Proceeding IEEE Ultrasonic Sympo, Vol. 1998, pp. 1289-1292 (1998)

Non-Patent Document 2: Proceeding of the IEEE, Vol. 61, No 8 pp. 1073-1092 (1973)

DISCLOSURE OF INVENTION

Problem to be Solved by the Invention

With the foregoing in mind, it is an object of the present invention to provide an acoustooptic device usable even with light in the ultraviolet region, free of laser damage and optical damage, and excellent in acoustooptic performance, with its light incident surface and light emitting surface not being affected by the adhesion of dust, and also to provide an optical imaging apparatus using the same.

Means for Solving Problem

An acoustooptic device according to the present invention includes: a high-frequency signal input part; a transducer part; and an acoustooptic medium. The acoustooptic device is configured so that a high-frequency signal input from the high-frequency signal input part is converted into a mechanical vibration by the transducer part and an optical characteristic of the acoustooptic medium varies depending on the mechanical vibration. In this acoustooptic device, the acoustooptic medium is formed of a Group III nitride crystal.

Herein, the acoustooptic medium whose optical characteristic varies according to the mechanical vibration refers to the following. An ultrasonic wave in accordance with the high-frequency signal propagates in the acoustooptic medium. At this time, a variation in density corresponding to the wavelength of the ultrasonic wave is caused in the acoustooptic medium, so that a change in refractive index corresponding to the wavelength of the ultrasonic wave is caused in the acoustooptic medium. Because the period of this change in refractive index is approximately the same as the light wavelength, a diffraction grating for light is formed inside the acoustooptic medium. Light incident on the light incident surface of the acoustooptic medium is diffracted by the diffraction grating formed inside the acoustooptic medium, whereby an acoustooptic device is realized.

An optical imaging apparatus according to the present invention includes: a light source; an acoustooptic device; a driving circuit; and an image plane. The optical imaging apparatus is configured so that light from the light source is diffracted by the acoustooptic device in accordance with a signal from the driving circuit and the resultant diffracted light forms an image on the image plane. In this optical imaging apparatus, an acoustooptic medium of the acoustooptic device is formed of a Group III nitride crystal.

Effects of the Invention

According to the present invention, an acoustooptic device that is free of laser damage and optical damage and excellent in acoustooptic performance can be realized by using a Group III nitride crystal as an acoustooptic medium. Also, it becomes possible to avoid an influence of dust on a light incident surface or a light emitting surface, which may cause a problem in an acoustooptic device for light with short wavelengths, for example. Furthermore, according to the present invention, by using the Group III nitride crystal as the acoustooptic medium, it becomes possible to reduce the size of the driving circuit, improve the moisture resistance, and improve the resistance to damage caused when light in the ultraviolet region is used as incident light, thus providing an optical imaging apparatus that is inexpensive and has a simple configuration, for example.

Figure 1:
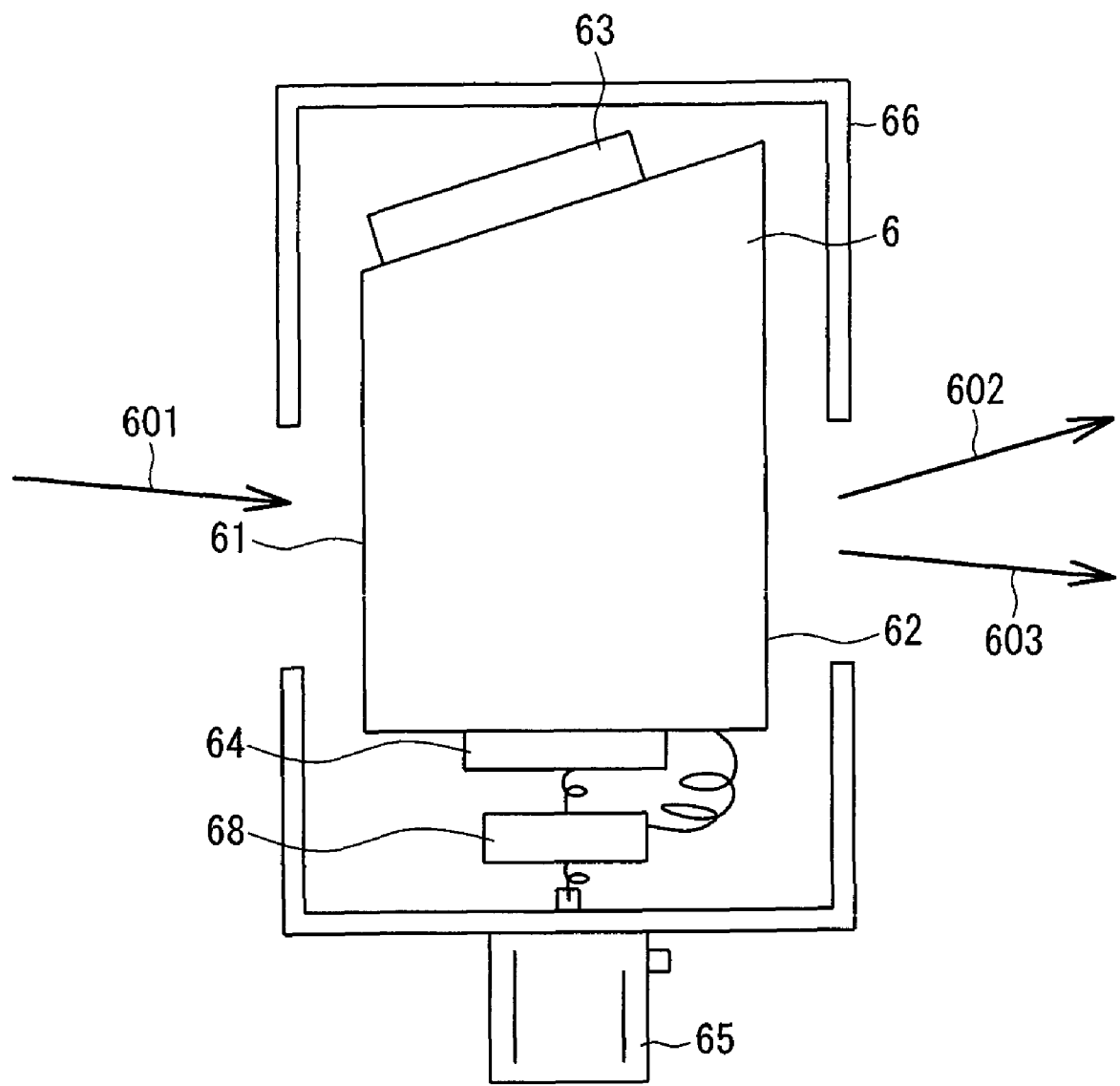
FIG. 1 shows an example of the configuration of an acoustooptic device according to the present invention.

EXPLANATION OF REFERENCE NUMERALS 6 acoustooptic medium
20 acoustooptic device
22 driving circuit
24 image plane
26 movable mirror
28, 29 light source
30 beam stopper
61 light incident surface
62 light emitting surface
63 sound absorbing material
64 transducer part
65 high-frequency signal input part
66 container
68 impedance matching part
201, 601 incident light
202, 602 diffracted light
203, 603 transmitted light

DESCRIPTION OF THE INVENTION

In the present invention, the Group III nitride crystal is not particularly limited. Preferably, the Group III nitride crystal is represented by a composition formula $Al_uGa_vIn_{(1-u-v)}N$ (where $0 \leq u \leq 1$, $0 \leq v \leq 1$, and $u+v \leq 1$), for example. Specific examples of the Group III nitride crystal include a GaN crystal, an AlN crystal, a solid solution of GaN and AlN (an AlGaN crystal), and crystals containing In, such as an AlGaInN crystal. The Group III nitride crystal may be free of a dopant element or may contain a dopant element as will be described later. However, in order to avoid the influence of the adhesion of dust, it is desirable that the Group III nitride crystal contains a dopant element. Among the above-noted crystals, it is preferable to use a GaN crystal, an AlN crystal, an AlGaN crystal, and an AlGaInN crystal. When a crystal free of In, e.g., an AlN crystal or an AlGaN crystal, is used as the acoustooptic medium, it is possible to realize an acoustooptic device that can utilize incident light in the vicinity of the ultraviolet region with a wavelength of about 220 nm. It is to be noted that the term "solid solution" as used herein refers to a homogeneous-phase solid solution and is synonymous with the term "mixed crystal" as used in the field of semiconductor.

A performance constant M2 of the acoustooptic medium is expressed by the following equation:

$$M2 = n^6 p^2 / \rho v^3,$$

where n is a refractive index of the medium, p is a photoelastic constant, $\rho$ is a density of the medium, and v is a sound velocity within the medium.

As indicated by the above equation, since the performance constant of the acoustooptic medium increases with an increase in the refractive index of the medium, the medium having a high refractive index is useful as the acoustooptic medium. On the other hand, it can be said that Group III nitride crystals, which exhibit great electronic polarization and hence are expected to have a great photoelastic constant, can serve as an excellent material for the acoustooptic medium. Moreover, in recent years, it has been revealed that the GaN crystal and the AlN crystal have potential for growing into a high-quality, large crystal not only by a conventionally-proposed vapor growth method but also by a liquid phase method using an alkali metal or the like, and it is expected that an acoustooptic device using a Group III nitride bulk crystal can be obtained at a relatively low cost.

In the present invention, the Group III nitride crystal may be produced by any method. However, it is preferable that the Group III nitride crystal is produced by a liquid phase method because a high-quality, large single crystal can be obtained by this method. Preferably, the liquid phase method includes the step of reacting a Group III element with nitrogen in a melt containing at least one of an alkali metal and an alkaline-earth metal, the Group III element, and the nitrogen in a nitrogen-containing gas atmosphere to grow a Group III nitride crystal. Examples of the Group III element include Al, Ga, and In. They may be used either alone or in combinations of at least two kinds thereof. Examples of the alkali metal include Li, Na, K, Rb, and Cs, and examples of the alkaline-earth metal include Ca, Mg, Be, Sr, and Ba. They may be used either alone or in combinations of at least two kinds thereof. The alkali metal preferably is Na, Li or K, and the alkaline-earth metal preferably is Ca. It is particularly preferable to use Na and Ca in combination. It is preferable to perform the liquid phase method while applying heat and pressure, e.g., under the conditions of a pressure in the range from 2 atm to 100 atm ($2 \times 1.01325 \times 10^5$ Pa to $100 \times 1.01325 \times 10^5$ Pa) and a temperature in the range from 600° C. to 1800° C. An optimal pressure and an optimal temperature vary depending on the composition of a crystal to be grown. For example, when growing a crystal with a composition containing a large amount of Al, it is preferable to grow the crystal under high temperature and low pressure conditions. On the other hand, when growing a crystal with a composition containing a large amount of Ga or In, it is preferable to grow the crystal under low temperature and high pressure conditions. The nitrogen-containing gas preferably is nitrogen gas, ammonia gas, or mixed gas containing both nitrogen gas and ammonia gas, for example. The nitrogen-containing gas may contain, for example, inert gas (e.g., Ar, He and Ne), hydrogen gas, etc. A nitrogen source for the nitrogen contained in the melt is not particularly limited, and can be, for instance, nitrogen-containing gas or a nitrogen compound mixed in the melt. Examples of the nitrogen compound include hydrazine ($H_2NNH_2$) and sodium azide.

In the present invention, the wavelength of light incident on the acoustooptic device is not particularly limited, and it preferably is in a short wavelength range from 488 nm to 220 nm, more preferably from 380 nm to 220 nm, and particularly preferably from 380 nm to 266 nm, for example. Since the acoustooptic device according to the present invention uses a Group III nitride crystal as the acoustooptic medium, it particularly is useful when the incident light has a short wavelength. Note here that, in the present invention, the short wavelength is defined as a wavelength in the range from 488 nm to 220 nm.

In the present invention, it is preferable that the Group III nitride crystal is electrically conductive. When the acoustooptic device is electrically conductive, the adsorption of dust and the like onto the light incident surface and the light emitting surface can be suppressed, thus allowing an acoustooptic device that is still more excellent in long-term reliability to be realized.

The electroconductivity can be controlled by, for instance, doping with a dopant element. Examples of the dopant element include Si, Li, Mg, Zn, and O, which may be used either alone or in combinations of at least two kinds thereof. Among these, it is preferable to use Si or Li because this allows a crystal having a relatively low resistivity to be obtained while maintaining the transparency of the crystal.

One possible way of imparting electroconductivity to the surface of the crystal is, for example, coating the surface of the crystal with a transparent film such as an ITO (Indium Tin Oxide) film. However, the ITO film has drawbacks in that the transmittance thereof deteriorates when light with wavelengths shorter than 400 nm is used as incident light and that the ITO film is susceptible to laser damage. Hence, the ITO film is not suitable for use in an acoustooptic device transmitting a laser beam.

In the present invention, when the Group III nitride crystal is obtained by the liquid phase method using a melt, it is preferable that the melt contains any of the above-noted dopant elements. Preferably, the Group III nitride crystal is obtained by changing the concentration of the dopant element in the melt in a process of growing the Group III nitride crystal. Preferably, the concentration of the dopant element is changed so that it is increased according to the growth of the crystal. The concentration may be changed continuously, or it may be changed stepwise, e.g., in one step or two or more steps. Examples of the method of increasing the concentration stepwise include a method of performing a process of keeping the concentration constant for a predetermined time and then increasing the concentration for a desired number of times. For example, when the concentration of the dopant element in the melt is changed in one step, the concentration before being changed may be set to 0.001 mol % to 0.005 mol % while the concentration after being changed may be set to 0.01 mol % to 0.1 mol %, so that the concentration of the dopant element after being changed would be 2 to 100 times that of the dopant element before being changed, for example.

In the present invention, the resistivity of the Group III nitride crystal is, for example, $1 \times 10^{-3}$ Ω·cm to $1 \times 10^4$ Ω·cm, preferably $1 \times 10^{-2}$ Ω·cm to $1 \times 10^3$ Ω·cm, and more preferably $1 \times 10^{-1}$ Ω·cm to $1 \times 10^2$ Ω·cm. The resistivity can be measured easily by a four-terminal method, for example.

In the present invention, it is preferable that the resistivity inside the Group III nitride crystal is greater than the resistivity in an outer peripheral portion of the Group III nitride crystal. When the resistivity in the outer peripheral portion of the acoustooptic medium is smaller as described above, the adhesion of dust onto the surface of the acoustooptic medium can further be suppressed. The resistivity ($R_i$) inside the Group III nitride crystal is, for example, $1 \times 10^2$ Ω·cm to $1 \times 10^6$ Ω·cm, preferably $1 \times 10^3$ Ω·cm to $1 \times 10^4$ Ω·cm, and the resistivity ($R_e$) in the outer peripheral portion of the Group III nitride crystal is, for example, $1 \times 10^{-3}$ Ω·cm to $1 \times 10^2$ Ω·cm, preferably $1 \times 10^{-2}$ Ω·cm to $1 \times 10^1$ Ω·cm. Note here that, in the present invention, the outer peripheral portion of the Group III nitride crystal is defined as a portion with a thickness of 100 μm as measured from an outer periphery of the crystal block, and the inside of the Group III nitride crystal refers to the remaining portion.

In the present invention, it is preferable that the acoustooptic medium includes at least one of a light incident surface and a light emitting surface.

In the present invention, it is preferable that the acoustooptic device further includes an antireflection member and that the antireflection member is formed on at least one of the light incident surface and the light emitting surface. The antireflection member preferably is a dielectric thin film, examples of which include a $SiO_2$ film and an $Al_2O_3$ film. The antireflection member may be a single-layer film or a multilayer film composed of two or more layers. Preferably, the antireflection member is a single-layer $SiO_2$ film or a single-layer $Al_2O_3$ film. By using a Group III nitride crystal with a high refractive index and a single-layer film such as a single-layer $SiO_2$ film or a single-layer $Al_2O_3$ film in combination, it is possible to realize a highly reliable acoustooptic device provided with an antireflection member.

In the present invention, it is preferable that $n_1 t_1 = \lambda_1/4$ is satisfied, where $n_1$ is a refractive index of the dielectric thin film, $t_1$ is a thickness of the dielectric thin film, and $\lambda_1$ is a wavelength of incident light in a vacuum.

In the present invention, it is preferable that the acoustooptic device further includes a high thermal conductive sheet and that the high thermal conductive sheet is formed on at least part of the acoustooptic medium. It is preferable that the high thermal conductive sheet is electrically conductive.

In the present invention, the acoustooptic device further includes a grounding member and that the acoustooptic medium is grounded electrically by the grounding member. The grounding member is not particularly limited, and preferably is a thermal conductive sheet. By this grounding member, the adhesion of dust onto the surface of the acoustooptic medium can be suppressed still further.

The acoustooptic device to be used in the optical imaging apparatus according to the present invention is not particularly limited as long as a Group III nitride crystal is used as the acoustooptic medium. For example, the acoustooptic device according to the present invention can be used as the acoustooptic device.

In the optical imaging apparatus according to the present invention, the Group III nitride crystal is not particularly limited. Preferably, the Group III nitride crystal is represented by a composition formula $Al_uGa_vIn_{(1-u-v)}N$ (where $0 \leq u \leq 1$, $0 \leq v \leq 1$, and $u+v \leq 1$), for example. Specific examples of the Group III nitride crystal include a GaN crystal, an AlN crystal, a solid solution of GaN and AlN (an AlGaN crystal), and crystals containing In, such as an AlGaInN crystal. Among these, an AlN crystal, a GaN crystal, and an AlGaN crystal are preferable. With the use of the acoustooptic device employing an acoustooptic medium formed of a GaN crystal, an AlN crystal, or an AlGaN crystal, an optical imaging apparatus can be realized that has a still more simple driving circuit when light with a short wavelength in the blue to ultraviolet region is used as incident light.

Preferably, the optical imaging apparatus according to the present invention further includes an antireflection member and the antireflection member is formed on at least one of a light incident surface and a light emitting surface of the acoustooptic medium.

In the optical imaging apparatus according to the present invention, it is preferable that the acoustooptic medium is electrically conductive, and it is more preferable that the acoustooptic medium is grounded electrically.

Preferably, the optical imaging apparatus according to the present invention further includes a movable mirror.

Preferably, the optical imaging apparatus further includes a beam stopper and the beam stopper shields light transmitted through the acoustooptic device.

In the optical imaging apparatus according to the present invention, the image plane preferably is a photoreceptor, and the photoreceptor preferably is a phosphor.

Hereinafter, the present invention will be described more specifically by way of examples. Although the following examples are directed to the case where a GaN crystal or an AlN crystal was used as a Group III nitride crystal, the present invention also can be embodied by using other Group III nitride crystals such as an AlGaN crystal and an AlGaInN crystal.

EXAMPLE 1

A GaN crystal was formed into a prism shape. Using this GaN crystal as an acoustooptic medium, an acoustooptic device shown in FIG. 1 was produced. The acoustooptic device shown in FIG. 1 merely is an illustrative example of the acoustooptic device according to the present invention, and the configuration of the acoustooptic device according to the present invention is by no means limited thereto.

As shown in FIG. 1, the acoustooptic device includes, as main components, a high-frequency signal input part 65, a transducer part 64, and an acoustooptic medium 6. The acoustooptic medium 6 is arranged inside a container 66, and the high-frequency signal input part 65 is arranged outside the container 66. The high-frequency signal input part 65 is connected to the transducer part 64 via an impedance matching part 68, and the transducer part 64 is arranged on one surface of the acoustooptic medium 6. In the acoustooptic medium 6, a sound absorbing material 63 is arranged on a surface that opposes the surface on which the transducer part 64 is arranged. The transducer part 64 can be formed of a piezoelectric crystal such as $LiNbO_3$, for example. The impedance matching part 68 serves to match electrical impedances of the high-frequency signal input part 65 and the transducer part 64, and the sound absorbing material 63 serves to absorb ultrasonic waves so as to prevent the ultrasonic waves from being reflected again at an edge of the acoustooptic medium 6 to return to the transducer part 64 side.

An ultrasonic wave (generally around 10 MHz to 2000 MHz) in accordance with a high-frequency signal input from the high-frequency signal input part 65 propagates in the acoustooptic medium 6. At this time, the variation in density corresponding to the wavelength of the ultrasonic wave is caused in the acoustooptic medium 6, which results in change in refractive index corresponding to the wavelength. Since the period of the change in refractive index is about the same as the wavelength of light, a diffraction grating for light is formed inside the acoustooptic medium 6. Incident light 601 that has entered a light incident surface 61 of the acoustooptic medium 6 and been diffracted by the diffraction grating formed inside the acoustooptic medium 6 is diffracted light 602, and the incident light 601 that has entered the light incident surface 61 of the acoustooptic medium 6 and transmitted therethrough without being diffracted is transmitted light 603. The diffraction angle of the diffracted light 602 varies depending on the frequency of the high-frequency signal applied to the high-frequency signal input part 65, and the diffraction efficiency of the diffracted light 602 varies depending on the magnitude of the high-frequency signal applied to the high-frequency signal input part. The diffraction angle is, for instance, about 0.2° to several degrees, and the diffraction angle increases with an increase in the frequency of the ultrasonic wave that has been entered.

The acoustooptic device produced in the present example could achieve a diffraction efficiency of 10% to 60% with respect to a CW laser beam with a wavelength of 488 nm when the input RF power was 2 W, for example. In general, a RF power of about 0.5 W to 5 W is input to the transducer part 64 via the impedance matching part 68 as a driving power for the acoustooptic device, and this electric power turns into heat eventually. Thus, using a material with high thermal conductivity as the acoustooptic medium is advantageous in terms of heat dissipation. Furthermore, even in the case where continuous light with an incidence power of 1 W entered the acoustooptic device of the present example, it was possible to obtain high-quality diffracted light that caused no drift or defocus. Since the acoustooptic device according to the present example uses a GaN single crystal as the acoustooptic medium 6, the acoustooptic device has a feature that it has high thermal conductivity and the distortion in a beam pattern is small even when an optical power is high.

Although the present example is directed to the case where a laser beam with a wavelength of 488 nm was used as incident light, it should be noted that an acoustooptic medium formed of a GaN crystal can transmit light with a wavelength of up to about 380 nm, for example, and an acoustooptic medium formed of an AlN crystal can transmit light with a wavelength of up to about 220 nm, for example. Therefore, using an acoustooptic medium formed of a Group III nitride crystal is extremely useful to provide an acoustooptic device for light having short wavelengths, such as blue light and ultraviolet light.

Figure 2:
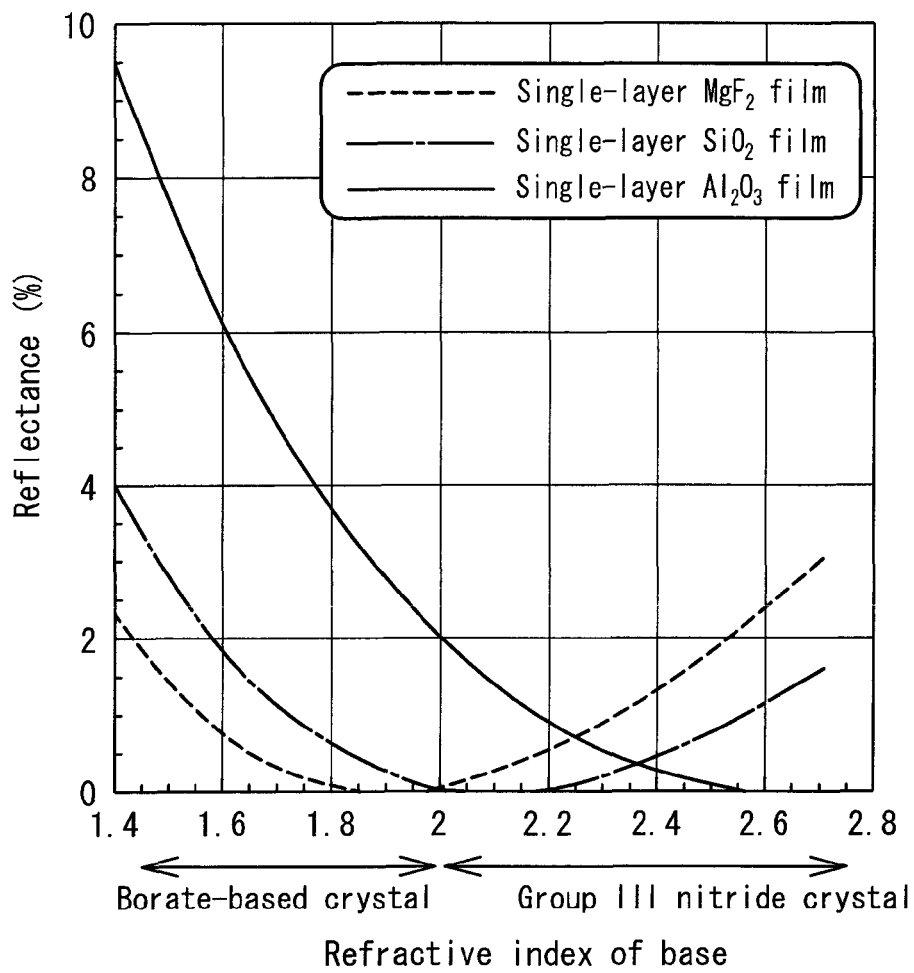
FIG. 2 is a graph illustrating the reflectance resulting from different materials of an antireflection film and different refractive indices of an acoustooptic medium in Example 1 of the present invention.

By providing an antireflection member composed of a dielectric thin film (hereinafter referred to also as an antireflection film) on the light incident surface 61 or a light emitting surface 62 of the acoustooptic medium 6, it becomes possible to further improve the light transmittance and to prevent a decrease in extinction ratio due to multiple reflection of light inside the acoustooptic medium 6. An antireflection film with a single-layer structure will be described with reference to the graph shown in FIG. 2. FIG. 2 is a graph showing the relationship between the refractive index of the base (i.e., the refractive index of the acoustooptic crystal) and the reflectance (%) when a borate-based crystal and a Group III nitride crystal were used as acoustooptic media, and a single-layer $MgF_2$ film, a single-layer $SiO_2$ film, and a single-layer $Al_2O_3$ film respectively were formed on each of these crystals as an antireflection film. As can be seen from the graph of FIG. 2, when the Group III nitride crystal was used as the acoustooptic medium, the refractive index of the Group III nitride crystal was higher than that of the borate-based crystal, and $SiO_2$ and $Al_2O_3$ having excellent moisture resistance and excellent mechanical strength can be used as the antireflection film for a single wavelength. For example, a film formed so as to satisfy $n_1 t_1 = \lambda_1/4$, where $n_1$ is the refractive index of the film, $t_1$ is the thickness of the film, and $\lambda_1$ is the wavelength in a vacuum of light to be used, can serve as an antireflection film. With this configuration, it is possible to realize an antireflection film, one side of which exhibits a reflectance of about 1% or lower with respect to light with a desired wavelength. Moreover, since such a film has excellent moisture resistance and mechanical strength, it is particularly advantageous in practice. On the other hand, as the antireflection film (for light with a single wavelength) for the borate-based crystal, the single-layer $MgF_2$ film is suitable in terms of refractive index, but $MgF_2$ has a drawback in that a single-layer film formed thereof does not exhibit sufficient moisture resistance or mechanical strength. In optical systems in which an optical fiber or a laser beam is used, a single wavelength generally is used so that, most of the cases, the antireflection film may be a single-layer film.

EXAMPLE 2

Acoustooptic devices were produced using an AlN crystal, a GaN crystal, a $Li_2B_4O_7$ crystal, a $MgO:LiNbO_3$ crystal (a $LiNbO_3$ crystal doped with MgO), a $LiNbO_3$ crystal, and a $TeO_2$ crystal, respectively, as their acoustooptic media. With regard to the thus-obtained acoustooptic devices, laser damage and optical damage caused by a pulse laser beam using a second harmonic of a $Ti:Al_2O_3$ laser and having a wavelength of 400 nm was measured. The optical damage was measured using continuous light emitted from an argon laser with a wavelength of 488 nm as a light source under the condition that the laser intensity at the sample position was 1.8 $kW/mm^2$. The results are shown in Table 1 below.

TABLE 1

| Material | Laser Damage Threshold | | Presence or Absence of Optical Damage |
|---|---|---|---|
| | Absolute Value $(KW/mm^2)$ | Relative Value | |
| $TeO_2$ | 34 | 1 | Absent |
| $LiNbO_3$ | 105 | 3 | Present |
| $MgO: LiNbO_3$ | 70-105 | 2-3 | Absent |
| $Li_2B_4O_7$ | At least 140 | At least 4 | Absent |
| GaN | At least 140 | At least 4 | Absent |
| AlN | At least 140 | At least 4 | Absent |

As shown in Table 1, in the acoustooptic devices respectively using the $TeO_2$ crystal and the $MgO:LiNbO_3$ crystal, laser damage caused by the pulse laser beam was observed when the power of the laser beam was relatively low, as known from the conventional example (JP 2004-170940 A). On the other hand, in the acoustooptic devices respectively using the $Li_2B_4O_7$ crystal, the GaN crystal, and the AlN crystal, the absolute value of laser damage threshold was at least 140 $KW/mm^2$, thus yielding an extremely large relative value of laser damage threshold of at least 4 with respect to $TeO_2$. Note here that the absolute value of laser damage threshold is the measurement limit of the measurement system. The optical damage (the distortion in a beam pattern) was observed only in the acoustooptic device using the $LiNbO_3$ crystal, and was not observed in the acoustooptic devices respectively using the crystals other than the $LiNbO_3$ crystal, namely, the $TeO_2$ crystal, the $MgO:LiNbO_3$ crystal, the $Li_2B_4O_7$ crystal, the GaN crystal, and the AlN crystal.

In the acoustooptic devices respectively using the GaN crystal and the AlN crystal, the absolute value of the laser damage threshold was large and no optical damage was observed, as described above. This demonstrates that the acoustooptic device according to the present invention is excellent. Also, it is considered that the acoustooptic device according to the present invention is adaptable to both the cases where the peak power is relatively high and where continuous light is used.

Next, with regard to acoustooptic devices produced using an AlN crystal (with a low resistivity), GaN crystals (with a high resistivity and a low resistivity), a $Li_2B_4O_7$ crystal, a $MgO:LiNbO_3$ crystal, and a $LiNbO_3$ crystal, respectively, as their acoustooptic media, adhesion of dust onto the crystal surface and deterioration in transmittance of the crystal were evaluated in the following manner. Light with a wavelength of 440 nm emitted from a semiconductor laser was focused on the surface of each of the crystals so as to form a focal spot with a diameter of about 10 $\mu m\phi$ to 100 $\mu m\phi$ so that the light would be continuous light with a relatively short wavelength. After the crystal surface was irradiated with the continuous light for about 500 to 1000 hours, the state of the crystal surface was observed. The results are shown in Table 2 below. Note here that the adhesion of dust and the deterioration in transmittance of the crystal lead to problems when light with a relatively short wavelength is used.

TABLE 2

| Material | Resistance to Dust Adhesion |
|---|---|
| $LiNbO_3$ | x-Δ |
| MgO: $LiNbO_3$ | x-Δ |
| $Li_2B_4O_7$ | Δ-o |
| GaN (high resistivity) | Δ-o |
| GaN (low resistivity) | o |
| AlN (low resistivity) | o |

In Table 2, the marks × and Δ indicate that the deterioration in transmittance of the crystal and the adhesion of dust were observed, with Δ indicating that the degrees thereof being less significant than that indicated with ×, and the mark o indicates that no change from the initial state was observed (i.e., the adhesion of dust was not observed). Note here that the high resistivity refers to a resistivity of $1 \times 10^5$ Ω·cm or higher, and the low resistivity refers to a resistivity in the range from $1 \times 10^{-3}$ Ω·cm to $1 \times 10^4$ Ω·cm.

From these results, it can be seen that the adhesion of dust onto the crystal surface and the deterioration in transmittance of the crystal were significant in the acoustooptic devices respectively using the $LiNbO_3$ crystal and the $MgO:LiNbO_3$ crystal, and were observed in the acoustooptic device using the $Li_2B_4O_7$ crystal. In contrast, although the slight adhesion of dust was observed in the case where the GaN crystal with a high resistivity was used, the adhesion of dust was hardly observed in the case where the GaN crystal with a low resistivity and the AlN crystal were used. In acoustooptic devices using the same types of GaN crystals with the resistivity thereof being decreased by doping with Si or the like, the adhesion of dust and the deterioration in transmittance were hardly observed.

Furthermore, when growing a Group III nitride crystal in a melt containing an alkali metal and the like, it is possible to obtain the crystal in which the resistivity in the outer peripheral portion is smaller than the resistivity inside by, for example, allowing the crystal to grow into a certain size using the melt containing little dopant element crystal during the initial stage of crystal growth and then allowing the crystal to grow using, as a second melt, a melt with a high dopant concentration. By using such a Group III nitride crystal, it was possible to obtain an acoustooptic medium in which electrostatic buildup was prevented, light absorption by free electrons was minimized, and no dust adsorption was caused.

The adhesion of dust occurs because impurities or dust in the air, ionized or activated with light, are adsorbed onto the crystal surface with static electricity or the like, and it is considered that a LiNbO$_3$ crystal, which is a ferroelectric and also an insulator, is particularly liable to adsorb dust and fine particles in the air with static electricity. When the dust and fine particles adsorbed are irradiated with light, a chemical reaction or the like occurs on the surface, resulting in deterioration in light transmittance. However, in the acoustooptic device according to the present invention, since a Group III nitride crystal is used as an acoustooptic medium, the adhesion of dust and the deterioration in light transmittance can be suppressed. Moreover, by controlling the resistivity of the Group III nitride crystal through doping or the like, for example, the adhesion of dust and the chemical reaction on the surface of the acoustooptic medium caused thereby can be suppressed, thus allowing the adhesion of dust and the deterioration in light transmittance to be further suppressed.

EXAMPLE 3

First, acoustooptic modulators for continuous light emitted from a semiconductor laser with a wavelength of 440 nm were produced using an AlN crystal, a GaN crystal, a Li$_2$B$_4$O$_7$ crystal, and a MgO:LiNbO$_3$ crystal, respectively, as their acoustooptic media, and the acoustooptic performance thereof was evaluated. The results are shown in Table 3 below. In the acoustooptic devices respectively using the GaN crystal and the AlN crystal, the acoustooptic media were grounded electrically for an antistatic purpose.

TABLE 3

| Material | Diffraction Efficiency (%) |
| --- | --- |
| MgO: LiNbO$_3$ | 22 |
| Li$_2$B$_4$O$_7$ | 5 |
| GaN | 16 |
| AlN | 9 |

Since the mechanical impedances of the transducer part 64 and the acoustooptic medium 6 were not optimized completely, the results obtained did not necessarily reflect the acoustooptic performance as it was. However, as shown in Table 3, the acoustooptic devices using the GaN crystal and the AlN crystal, respectively, as their acoustooptic media could achieve a diffraction efficiency twice to triple that of the acoustooptic device using the Li$_2$B$_4$O$_7$ crystal. The diffraction efficiencies of the acoustooptic devices respectively using the GaN crystal and the AlN crystal were slightly lower than that of the acoustooptic device using the MgO:LiNbO$_3$ crystal. However, from the overall point of view with consideration also given to the problem of the adhesion of dust etc., it can be said that the acoustooptic devices respectively using the AlN crystal and the GaN crystal are excellent. Furthermore, in the acoustooptic devices respectively using the GaN crystal and the AlN crystal, when the RF signal input was 1 W to 2 W, neither the distortion in a beam pattern caused by heat nor the distortion in a beam pattern caused by optical damage or laser damage was observed.

EXAMPLE 4

Acoustooptic modulators for continuous light emitted from a semiconductor laser with a wavelength of 400 nm were produced using the same crystals as in Example 3, and the acoustooptic performance thereof was evaluated. The results are shown in Table 4 below. In the acoustooptic devices respectively using the GaN crystal and the AlN crystal, outer peripheral portions of the crystals were grounded electrically for an antistatic purpose.

TABLE 4

| Material | Diffraction Efficiency (%) |
| --- | --- |
| MgO: LiNbO$_3$ | 23 |
| Li$_2$B$_4$O$_7$ | 6 |
| GaN | 16 |
| AlN | 9 |

As shown in Table 4, the acoustooptic modulators respectively using the GaN crystal and the AlN crystal could achieve a diffraction efficiency twice to triple that of the acoustooptic modulator using the Li$_2$B$_4$O$_7$ crystal. Furthermore, in the acoustooptic modulators respectively using the GaN crystal and the AlN crystal, neither the distortion in a beam pattern due to optical damage nor laser damage was observed. The diffraction efficiencies of the acoustooptic modulators respectively using the GaN crystal and the AlN crystal were slightly lower than that of the acoustooptic device using the MgO:LiNbO$_3$ crystal. However, from the overall point of view with consideration also given to the problem of the adhesion of dust etc. when a laser beam with a wavelength of 400 nm entered for a long time of about 500 to 1000 hours, it can be said that the acoustooptic modulators respectively using the AlN crystal and the GaN crystal are excellent.

Although the present example is directed to the case where an acoustooptic device is an acoustooptic modulator, it should be noted that the acoustooptic device is not limited to the acoustooptic modulator, and can be other acoustooptic devices such as, for example, an acoustooptic deflector, an acoustooptic filter, and an acoustooptic frequency shifter.

EXAMPLE 5

Acoustooptic devices with the configuration shown in FIG. 1 were produced using an AlN crystal and a Li$_2$B$_4$O$_7$ crystal, respectively, as their acoustooptic media, and the acoustooptic performance thereof with respect to a third harmonic (with a wavelength of 355 nm) of a YAG laser was evaluated. The results are shown in Table 5 below. An antireflection film formed of a single-layer Al$_2$O$_3$ film for a wavelength of 355 nm was formed on each of a light incident surface and a light emitting surface of the acoustooptic medium formed of the AlN crystal.

TABLE 5

| Material | Diffraction Efficiency (%) |
| --- | --- |
| Li$_2$B$_4$O$_7$ | 5 |
| AlN | 10 |

As shown in Table 5, the acoustooptic device using the AlN crystal could achieve a diffraction efficiency about twice that of the acoustooptic device using the Li$_2$B$_4$O$_7$ crystal. Moreover, even after the acoustooptic device using the AlN crystal was irradiated with UV light having a wavelength of 355 nm continuously for 100 hours, deteriorations in transmittance and beam pattern were not found, and also neither the adsorption of dust onto the light incident surface and the light emitting surface nor the deterioration in transmittance caused by burning of the dust adsorbed was observed.

EXAMPLE 6

Acoustooptic devices with the configuration shown in FIG. 1 were produced using an AlN crystal and a $Li_2B_4O_7$ crystal, respectively, as their acoustooptic media, and the acoustooptic performance thereof with respect to a fourth harmonic (with a wavelength of 266 nm) of a YAG laser was evaluated. The results are shown in Table 6 below. An antireflection film formed of a single-layer $SiO_2$ film for a wavelength of 266 nm was formed on each of a light incident surface and a light emitting surface of the acoustooptic medium formed of the AlN crystal.

TABLE 6

| Material | Diffraction Efficiency (%) |
|---|---|
| $Li_2B_4O_7$ | 7 |
| AlN | 14 |

The acoustooptic device using the AlN crystal could achieve a diffraction efficiency about twice that of the acoustooptic device using the $Li_2B_4O_7$ crystal. Moreover, even after the acoustooptic device using the AlN crystal was irradiated with UV light having a wavelength of 266 nm continuously for 100 hours, deteriorations in transmittance and beam pattern were not found, and also neither the adsorption of dust onto the light incident surface and the light emitting surface nor burning of the dust adsorbed was observed.

EXAMPLE 7

Figure 3:
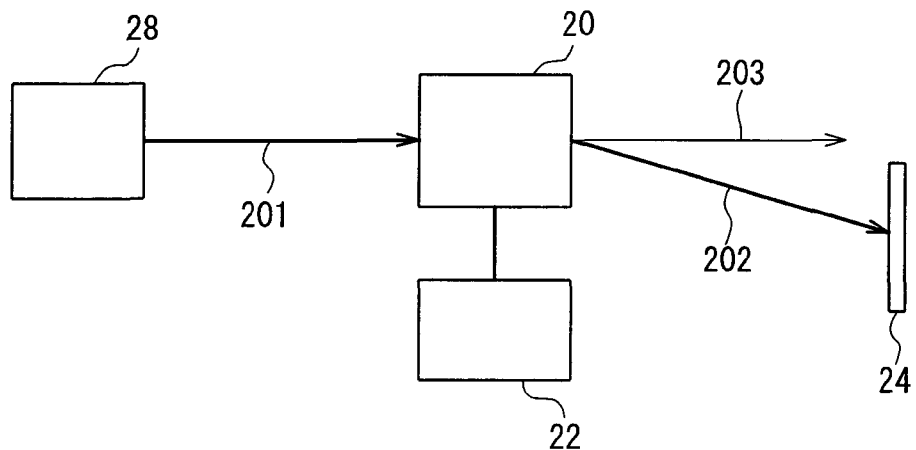
FIG. 3 shows an example of the configuration of an imaging apparatus according to the present invention.

One example of the optical imaging apparatus according to the present invention will be described with reference to FIG. 3. The optical imaging apparatus shown in FIG. 3 merely is an illustrative example of the optical imaging apparatus according to the present invention, and the configuration of the optical imaging apparatus according to the present invention is by no means limited thereto. The optical imaging apparatus shown in FIG. 3 includes, as main components, a light source 28, an acoustooptic device 20, an image plane 24, and a driving circuit 22.

Incident light 201 emitted from the light source 28 enters the acoustooptic device 20. The basic configuration of the acoustooptic device is the same as that shown in FIG. 1. Diffracted light 202 modulated in accordance with to a signal from the driving circuit 22 and transmitted light 203 are emitted from the acoustooptic device 20. Diffracted light that provides a high extinction ratio (i.e. a big difference between a state where light is ON and a state where light is OFF) may be used. Alternatively, depending on the intended use, only the transmitted light or both the transmitted light and the diffracted light may be used. The diffracted light 202 reaches the image plane to form an image or a line corresponding to the signal from the driving circuit.

A GaN crystal semiconductor laser (with a wavelength of 410 nm and an output of 50 mW) was used as the light source 28. As an acoustooptic medium, an electrically conductive GaN crystal with a resistivity of about $1 \times 10^3$ $\Omega \cdot cm$ was used. The GaN crystal was grounded electrically to the acoustooptic medium, thus providing the acoustooptic device. Since the GaN-based semiconductor laser has a low optical power, it can be used as, for example, a light source of a laser microscope or a light source of a laser printer. When the optical imaging apparatus according to the present invention is used as the light source of the laser microscope, a smaller focal spot can be formed and improved resolution can be obtained as compared to the general case where a red semiconductor laser is used. Furthermore, the kind of a material can be identified by observing the fluorescence at the image plane (in this case, a sample plane). Moreover, when the optical imaging apparatus according to the present invention is used for a laser printer, a higher resolution laser printer can be realized.

Since the electrically conductive GaN crystal was used as the acoustooptic medium and besides, the acoustooptic medium was grounded electrically, no adhesion of dust nor deterioration in transmittance was found even after the acoustooptic device was irradiated with a laser beam having a wavelength of about 410 nm for about 500 to 1000 hours. As a result, it was possible to provide an optical imaging apparatus with excellent continuous-use performance.

EXAMPLE 8

Figure 4:
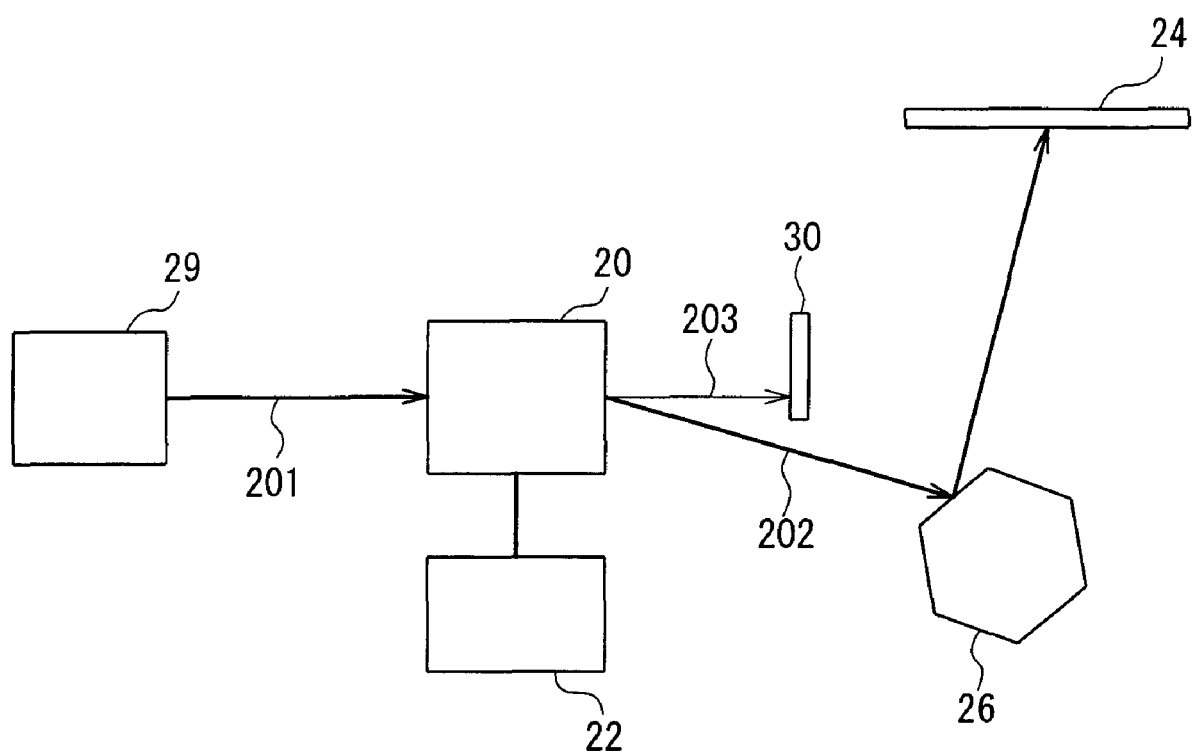
FIG. 4 shows another example of the configuration of the imaging apparatus according to the present invention.

Another example of the optical imaging apparatus according to the present invention will be described with reference to FIG. 4. The optical imaging apparatus shown in FIG. 4 includes, as main components, a light source 29, an acoustooptic device 20, a beam stopper 30, a movable mirror 26, an image plane 24, and a driving circuit 22.

Incident light 201 emitted from the light source 29 enters the acoustooptic device 20. Diffracted light 202 modulated in accordance with to a signal from the driving circuit 22 and transmitted light 203 are emitted from the acoustooptic device 20. When the diffracted light 202 is used, the transmitted light 203, which turns into stray light in the apparatus, is shielded with the beam stopper 30. The diffracted light 202 is reflected by the movable mirror 26 to form an image on the image plane 24.

A YAG laser (a third harmonics (with a wavelength of 355 nm) and an average output of 0.1 W) was used as the light source 29. AlN was used as an acoustooptic medium of the acoustooptic device 20. A polygon mirror was used as the movable mirror 26.

With such a configuration, the average output of the light source 29 is high and the light can be deflected at a large angle by the movable mirror 26. Hence, it can be used, for instance, for direct drawing on a printed board or as a light source of a laser display. When using it as an apparatus for direct drawing on a printed board, the apparatus is characterized in an improved resolution and a reduced cost of a photosensitizing agent.

Furthermore, in the case of using it as a light source of a laser display, when phosphors corresponding to red, green, and blue are applied to the image plane 24, a laser display can be realized in which the phosphors are excited by ultraviolet light. Since the laser beam projected directly to a display is not viewed but the phosphors excited on the image plane 24 and the red, green, and blue lights thus excited are viewed, a speckle noise, which is a disadvantage of a laser display, is not produced.

As described above, according to the present invention, it is possible to provide an acoustooptic device with excellent acoustooptic performance, in which no optical damage nor laser damage is caused when light in the blue to ultraviolet region is used. Note here that since Group III nitrides such as GaN and AlN have excellent thermal conductivity, it is not necessary to perform water cooling or the like even when a relatively large RF signal is input. In order to further improve the heat dissipation, it is preferable to cover a portion of the acoustooptic medium excluding its light incident surface and light emitting surface with a graphite sheet or the like, for example. This allows a larger amount of heat to escape into a housing, a case, etc. In this case, the acoustooptic medium may be grounded electrically via the graphite sheet.

Although the optical imaging apparatus that uses a laser beam with a wavelength of 410 nm or 355 nm was used in the above-described examples, it is of course possible to produce an optical imaging apparatus that uses a fourth harmonic (with a wavelength of 266 nm) of a YAG laser or other optical imaging apparatuss, for example. Furthermore, the optical imaging apparatus according to the present invention is not limited to the one that forms a particular image or line on the image plane, and can be, for example, an apparatus such as, for example, a laser microscope in which the whole image plane is irradiated.

INDUSTRIAL APPLICABILITY

According to the present invention, an acoustooptic device that is free from laser damage or optical damage and can achieve a relatively high efficiency and also an optical imaging apparatus using such an acoustooptic device can be realized at low cost. Therefore, the present invention is useful as acoustooptic devices such as an acoustooptic modulator, an acoustooptic deflector, an acoustooptic filter, and an acoustooptic frequency shifter, especially as an acoustooptic device for light with a short wavelength within the blue to ultraviolet region ranging from 488 nm to 220 nm, and as an optical imaging apparatus using such an acoustooptic device.

The invention claimed is:

1. An acoustooptic device comprising:
a high-frequency signal input part;
a transducer part; and
an acoustooptic medium,
the acoustooptic device being configured so that a high-frequency signal input from the high-frequency signal input part is converted into a mechanical vibration by the transducer part, and an optical characteristic of the acoustooptic medium varies depending on the mechanical vibration,
wherein the acoustooptic medium is formed of a Group III nitride crystal having electrical conductivity.

2. The acoustooptic device according to claim 1, wherein the Group III nitride crystal is represented by a composition formula $Al_uGa_vIn_{(1-u-v)}N$ (where $0 \leq u \leq 1$, $0 \leq v \leq 1$, and $u+v \leq 1$).

3. The acoustooptic device according to claim 1, wherein the Group III nitride crystal is one selected from the group consisting of a GaN crystal, an AlN crystal, and an AlGaN crystal.

4. The acoustooptic device according to claim 1, wherein incident light entering the acoustooptic device has a wavelength in a range from 488 nm to 220 nm.

5. The acoustooptic device according to claim 1, wherein the Group III nitride crystal has a resistivity of $1 \times 10^{-3}$ Ω·cm to $1 \times 10^4$ Ω·cm.

6. The acoustooptic device according to claim 1, wherein a resistivity inside the Group III nitride crystal is greater than a resistivity in an outer peripheral portion of the Group III nitride crystal.

7. The acoustooptic device according to claim 1, wherein the acoustooptic medium comprises at least one of a light incident surface and a light emitting surface.

8. The acoustooptic device according to claim 1, wherein the Group III nitride crystal contains a dopant element.

9. The acoustooptic device according to claim 8, wherein the dopant element is at least one selected from the group consisting of Si, Li, Mg, Zn, and O.

10. The acoustooptic device according to claim 1, wherein the Group III nitride crystal is obtained by a liquid phase method using a melt that contains at least one of an alkali metal and an alkaline-earth metal.

11. The acoustooptic device according to claim 10, wherein the melt further contains a dopant element, and the dopant element is at least one selected from the group consisting of Si, Li, Mg, Zn, and O.

12. The acoustooptic device according to claim 11, wherein the Group III nitride crystal is obtained by changing a concentration of the dopant element in the melt in a process of growing the Group III nitride crystal.

13. The acoustooptic device according to claim 7, further comprising an antireflection member,
wherein the antireflection member is formed on at least one of the light incident surface and the light emitting surface.

14. The acoustooptic device according to claim 13, wherein the antireflection member comprises at least one dielectric thin film selected from an $SiO_2$ film and an $Al_2O_3$ film.

15. The acoustooptic device according to claim 14, wherein the antireflection member is a single-layer $SiO_2$ film or a single-layer $Al_2O_3$ film.

16. The acoustooptic device according to claim 14, wherein $n_1 t_1 = \lambda_1/4$ is satisfied, where $n_1$ is a refractive index of the dielectric thin film, $t_1$ is a thickness of the dielectric thin film, and $\lambda_1$ is a wavelength of the incident light in a vacuum.

17. The acoustooptic device according to claim 1, further comprising a high thermal conductive sheet,
wherein the high thermal conductive sheet is formed on at least part of the acoustooptic medium.

18. The acoustooptic device according to claim 17, wherein the high thermal conductive sheet is electrically conductive.

19. The acoustooptic device according to claim 1, further comprising a grounding member,
wherein the acoustooptic medium is grounded electrically by the grounding member.

20. The acoustooptic device according to claim 19, wherein the grounding member is a thermal conductive sheet.

* * * * *